(12) United States Patent
Barghoorn et al.

(10) Patent No.: US 12,092,239 B2
(45) Date of Patent: Sep. 17, 2024

(54) VALVE BODY AND PROCESS VALVE

(71) Applicant: GEMÜ Gebr. Müller Apparatebau GmbH & Co. Kommanditgesellschaft, Ingelfingen (DE)

(72) Inventors: Maximilian Barghoorn, Schwäbisch Hall (DE); Michael Baumgärtner, Dörzbach (DE); Christian Dasbach, Weißbach (DE)

(73) Assignee: GEMÜ Gebr. Müller Apparatebau GmbH & Co. Kommanditgesellschaft, Ingelfingen (DE)

( * ) Notice: Subject to any disclaimer, the term of this patent is extended or adjusted under 35 U.S.C. 154(b) by 2 days.

(21) Appl. No.: 17/859,281

(22) Filed: Jul. 7, 2022

(65) Prior Publication Data
US 2023/0041387 A1    Feb. 9, 2023

(30) Foreign Application Priority Data
Aug. 3, 2021 (DE) .................. 10 2021 120 124.1

(51) Int. Cl.
*F16K 7/07* (2006.01)
*F16K 7/04* (2006.01)

(52) U.S. Cl.
CPC . *F16K 7/07* (2013.01); *F16K 7/04* (2013.01)

(58) Field of Classification Search
CPC ... F16K 7/07; F16K 7/06; F16K 7/075; F16K 7/04; Y10T 137/87434; Y10T 137/87426
USPC ................. 251/7, 5, 8; 137/601.04, 601.03
See application file for complete search history.

(56) References Cited

U.S. PATENT DOCUMENTS

| | | | | |
|---|---|---|---|---|
| 1,931,356 A | * | 10/1933 | Porter ...................... | F01P 7/12 92/92 |
| 3,011,518 A | * | 12/1961 | Day ........................ | F24F 13/10 251/212 |
| 3,060,966 A | * | 10/1962 | Ratelband ............... | F16K 7/075 251/5 |
| 3,552,712 A | | 1/1971 | Whitlock | |

(Continued)

FOREIGN PATENT DOCUMENTS

| | | |
|---|---|---|
| CH | 368352 A | 3/1963 |
| DE | 10 2012 111 193 B3 | 5/2014 |

(Continued)

OTHER PUBLICATIONS

Search Report of Priority Application 10 2021 120 124.1, filed Aug. 3, 2021. pp. 1-7.

(Continued)

*Primary Examiner* — Craig J Price
*Assistant Examiner* — Andrew J Rost
(74) *Attorney, Agent, or Firm* — George R. McGuire; Bond Schoeneck & King PLLC

(57) ABSTRACT

The invention relates to a valve body for a process valve, wherein an interior space of the valve body connects at least two ports to one another in a fluid-conducting manner, wherein at least one partition wall separates adjacent flow chambers of the interior space from one another, and wherein an outer shell and the at least one partition wall, at least in a blocking portion of the valve body extending essentially perpendicularly to a blocking axis, are made of a flexible material.

13 Claims, 7 Drawing Sheets

(56) References Cited

U.S. PATENT DOCUMENTS

| | | | | |
|---|---|---|---|---|
| 3,556,157 A | * | 1/1971 | Eckerlin | F16L 55/02763 |
| | | | | 251/8 |
| 3,717,176 A | * | 2/1973 | Smith | F16K 7/07 |
| | | | | 251/5 |
| 4,821,768 A | * | 4/1989 | Lett | F16L 55/02 |
| | | | | 251/118 |
| 2008/0105839 A1 | | 5/2008 | Jennings et al. | |
| 2010/0096019 A1 | | 4/2010 | Diperna | |

FOREIGN PATENT DOCUMENTS

| | | |
|---|---|---|
| JP | 59166768 A | 9/1984 |
| WO | 2005052419 A1 | 6/2005 |

OTHER PUBLICATIONS

European Search Report, Application No. EP 22 18 5391, dated Dec. 23, 2022, pp. 1-7.

\* cited by examiner

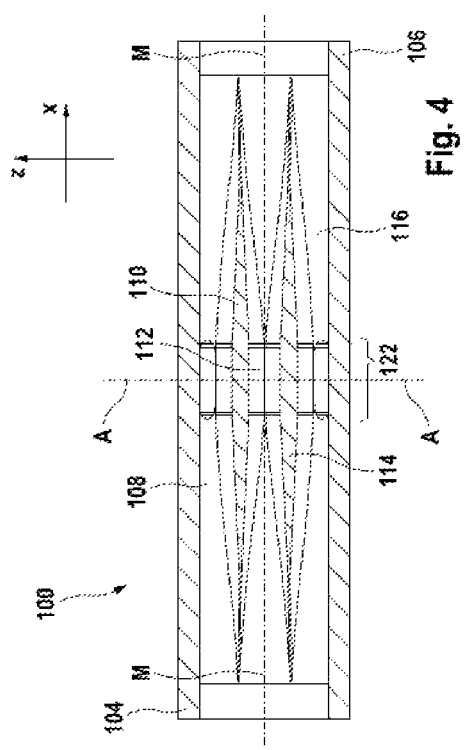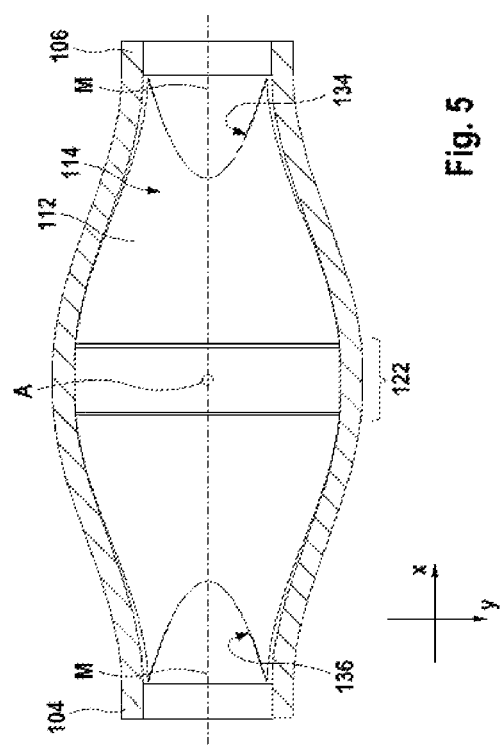

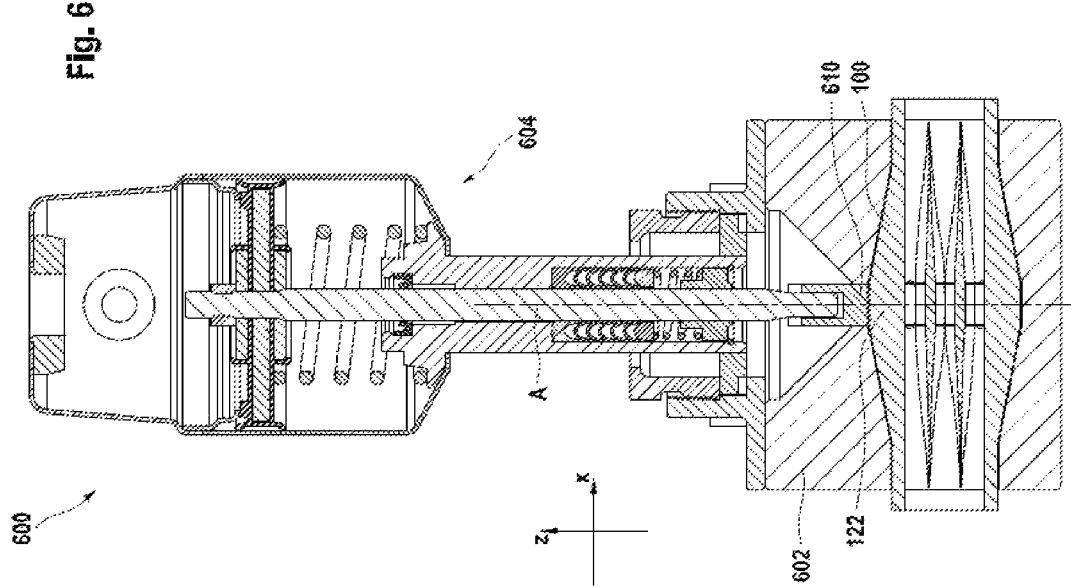

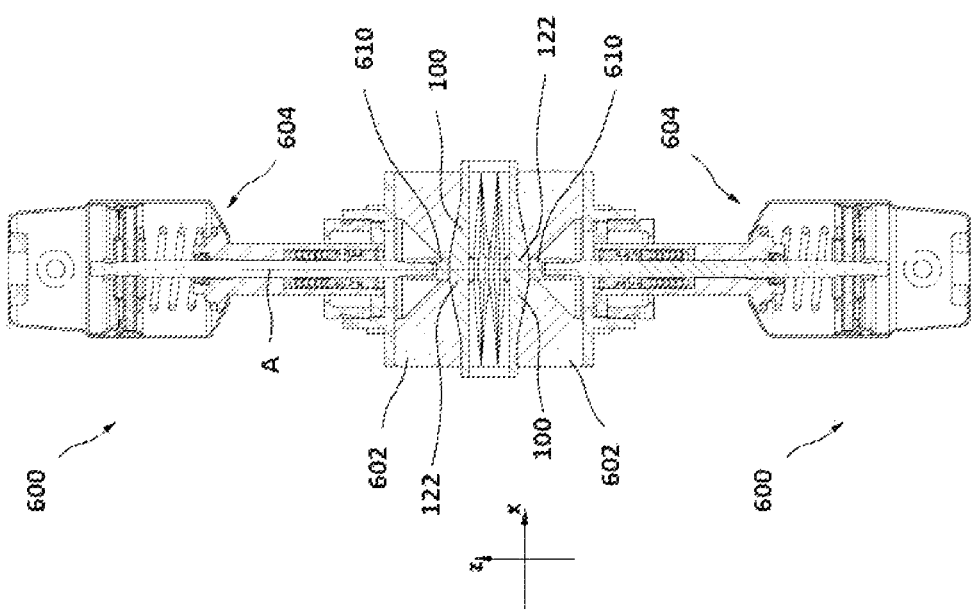

VALVE BODY AND PROCESS VALVE

CROSS-REFERENCE TO RELATED APPLICATION(S)

This application claims priority to German Patent Application No. 10 2021 120 124.1 filed with the German Patent Office on Aug. 3, 2021, the entirety of which is hereby incorporated by reference.

BACKGROUND

The invention relates to advances in the field of process valve technology.

SUMMARY

The problems of the prior art are solved by a valve body and by a process valve.

According to a first aspect of the description, a valve body for a process valve is provided, wherein an interior space of the valve body connects at least two ports to one another in a fluid-conducting manner, wherein at least one partition wall separates adjacent flow chambers of the interior space from one another, and wherein an outer shell and the at least one partition wall, at least in a blocking portion of the valve body extending essentially perpendicular to a blocking axis, are made of a flexible material.

The flow chambers allow the flow of the process fluid to be separated. A compressor acting on the blocking portion compresses the valve body. The division into a plurality of flow chambers improves a blocking or closing of the valve body as a result of the compression, because the plurality of flow chambers can be closed in a more controlled manner than a single flow chamber. Beyond that, the compression of the entire valve body is also reduced by the flow chambers that have been introduced. The service life of the valve body is thus increased by dividing it into flow chambers.

The process valve provided with the valve body can advantageously replace a tubing pinch valve.

An advantageous example is characterized in that the valve body is made in one piece from the flexible material, in particular an elastomer.

On the one hand, the one-piece design simplifies production, for example by 3-D printing. On the other hand, the one-piece design improves the sealing with respect to the outside, because the number of parts in contact with the process fluid is reduced.

An advantageous example is characterized in that an open cross section of the particular flow chamber is dimensioned larger perpendicularly to the blocking axis than along the blocking axis.

The travel of the compressor that is required to close the valve body is advantageously reduced in this way. On the other hand, this results in opposite contact surfaces of the flow chamber in the region of the blocking portion, which surfaces can shut off the flow more easily when pressed against one another. Furthermore, this dimensioning of the flow chambers allows an open cross section of the valve body in the region of the blocking portion to be structurally adjusted to the open cross section in the region of the ports.

The shape of the flow chambers or an imaginary elliptical contour of the flow chambers as a whole improves the control behavior of the process valve.

An advantageous example is characterized in that the particular flow chamber is delimited by two opposing contact surfaces which are convexly curved in cross section and, in particular, taper toward one another in a pointed manner.

The slot-shaped design of the flow chambers that is provided in this way provides sealing contours that improve the closing behavior.

An advantageous example is characterized in that the at least one partition wall follows a plane perpendicular to the blocking axis.

The flow of process fluid is thus affected as little as possible by the partition wall when the valve body is open. If the compressor acts on the valve body from the outside, then it closes perpendicularly to the flow axis.

An advantageous example is characterized in that the valve body comprises an odd number of flow chambers, in particular three or five flow chambers.

Advantageously, a flow chamber that is on average larger and is surrounded by two or four flow chambers can thus be provided. The odd number of flow chambers allows the valve body to be designed in a space-optimized manner, for example by making the outer flow chambers smaller than the central flow chamber.

An advantageous example is characterized in that the at least one partition wall tapers, at least in some parts, in a longitudinal section in which the blocking axis lies, starting from the blocking portion.

On the one hand, the region of the partition wall in the blocking portion, which is thus designed to be thicker, can thus contribute to secure closing. On the other hand, the tapering of the partition wall reduces turbulence in the process fluid and thus the flow resistance of the valve body.

An advantageous example is characterized in that the particular flow chamber widens, in particular continuously, at least in some parts, in particular in a longitudinal section perpendicular to the blocking axis, toward the blocking portion.

Advantageously, the open diameter available for the flow in this way is not reduced. The enlargement in this longitudinal section compensates for the provision of the partition wall. The constant widening improves the flow behavior and in particular reduces the flow resistance compared to a stepped design.

An advantageous example is characterized in that a course of a distal edge of the partition wall follows a convex curvature oriented toward the blocking portion.

The edge is thus advantageously set back toward the central longitudinal axis or the flow axis, which has a positive effect on the flow of the process fluid into or out of the particular expanding chamber. In particular, the edge is thus positioned almost transversely to the particular direction of flow of the process fluid and reduces turbulence.

According to a second aspect of the description, a process valve comprising the valve body according to the first aspect is provided.

An advantageous example is characterized in that the process valve comprises: a receiving body, which has an interior space that at least in some parts follows a substantially non-compressed outer contour of the valve body, wherein the valve body is accommodated in the interior space of the receiving body; and a valve drive, which is arranged rigidly with respect to the receiving body, wherein a compressor driven by the valve drive and movable along the blocking axis presses on the blocking portion of the valve body.

An advantageous example is characterized in that the process valve comprises: a further valve drive, which is arranged rigidly with respect to the receiving body on the opposite side of the first drive, wherein a compressor driven by the further valve drive and movable along the blocking axis presses on the blocking portion of the valve body.

The additional second drive advantageously reduces the load on the valve body.

BRIEF DESCRIPTION OF THE DRAWINGS

In the drawing,

FIGS. 3 to 5 show the valve body in different sections;

FIG. 6 shows the valve body in a process valve;

FIG. 9 shows the valve body in a process valve.

DETAILED DESCRIPTION

Figure 1:
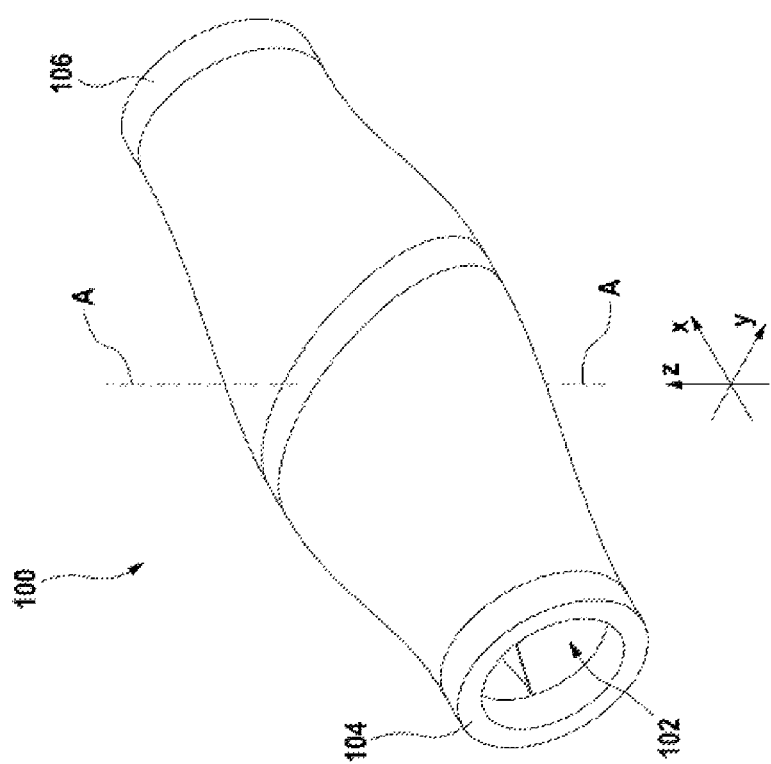
FIG. 1 shows a valve body in a perspective view.
Figure 2:
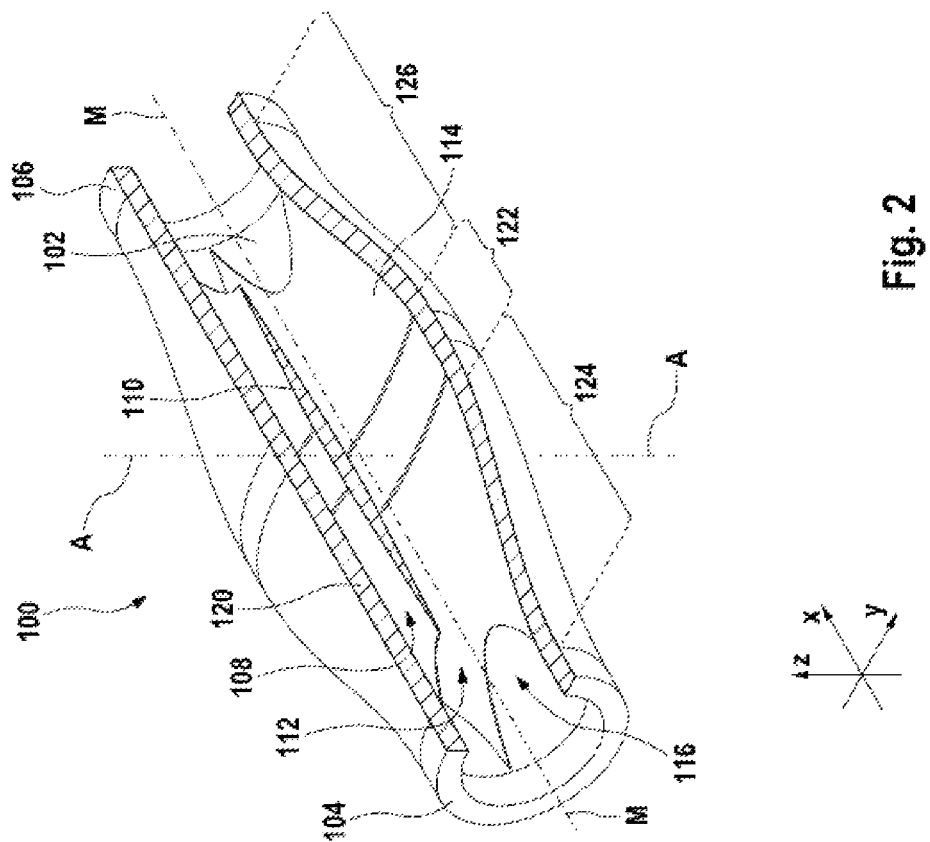
FIG. 2 shows the valve body analogous to FIG. 1 in a partially open view.

FIGS. 1 and 2 show a tubular valve body 100 for a process valve 600 in a relaxed state. The valve body 100 can also be designated as a hose portion. An interior space 102 of the valve body 100 connects at least two ports 104, 106 to one another in a fluid-conducting manner. In the relaxed state, process fluid can therefore flow from one port 104 to the other port 106. Partition walls 110, 114 separate adjacent flow chambers 108, 112 and 112, 116 of the interior space 102 from one another. An outer shell 120 and the at least one partition wall 110, 114, which can also be called a lamella, are made of a flexible material, at least in a blocking portion 122 of the valve body 100 that extends essentially perpendicularly to a blocking axis A.

The valve body 100 is therefore manufactured in one piece from the flexible material, in particular an elastomer, at least in the blocking portion 122 or in its entirety.

Alternatively, a second material can be provided to provide the valve body as a whole with the elastomer. For example, in the region of the ports 104, 106, inserts are provided which are made more rigid than the flexible material in the blocking portion 122, in order to make the ports 104, 106 more rigid and thus to improve the fastening of the valve body 100. Consequently, the valve body 100, at least in a proximal region which is arranged between the ports 104 and 106, is made of the flexible material.

The blocking portion 122 is arranged between two transition portions 124 and 126 which merge into the corresponding port 104, 106. The transition portions 124, 126 comprise a particular change in the geometry of the interior space 102 along a central longitudinal axis M of the valve body 100 and the partitions 110, 114 arranged therein.

Figure 3:
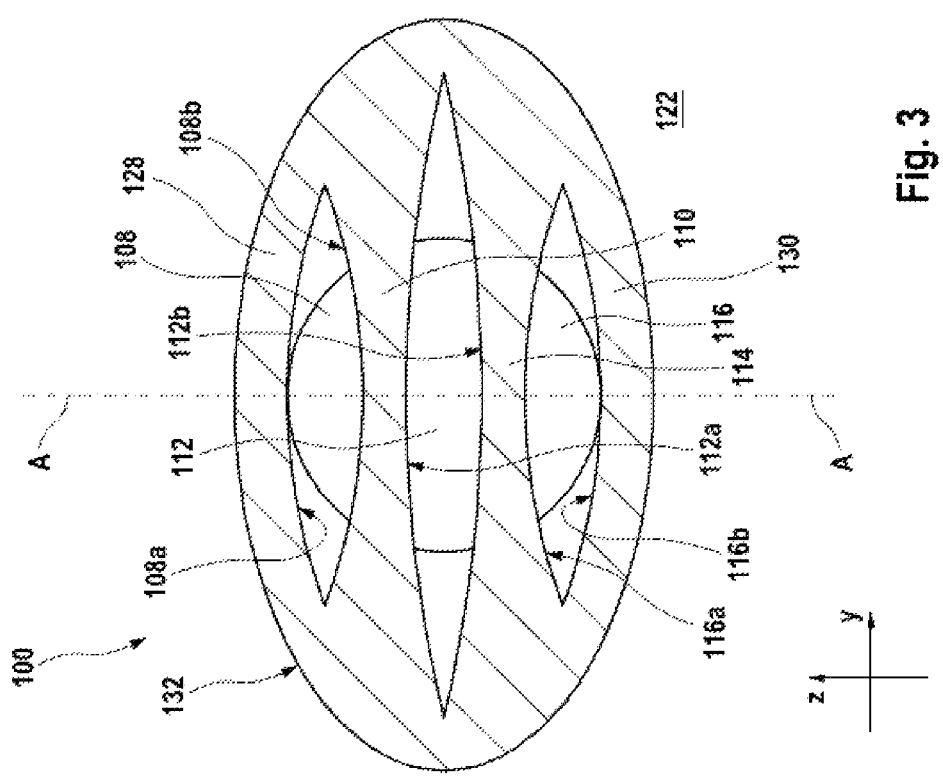

FIG. 3 shows the blocking portion 122 of the valve body 100 in a yz section. The flow chambers 108, 112, 116 have a common opening cross section that is similar in size to the opening cross section of the corresponding port 104, 106. The valve body 100 comprises an odd number of flow chambers 108, 112, 116, in particular, as shown, a number of three chambers or, in a form that is not shown, five or seven flow chambers. Of course, the number of flow chambers can also be even.

An open cross section of the particular flow chamber 108, 112, 116 perpendicular to the central longitudinal axis M is dimensioned larger perpendicular to the blocking axis A than along the blocking axis A. The particular flow chamber 108, 112, 116 is delimited by two opposing contact surfaces 108a-b, 112a-b, 116a-b, which are convexly curved in cross section and in particular taper toward one another in a pointed manner. The opposing contact surfaces 108a-b, 112a-b, 116a-b within the corresponding flow chamber 108, 112, 116 meet in cross section at an angle of less than 50°, in particular less than 40° and greater than 10°.

The particular partition wall 110, 114 follows a particular plane that is perpendicular to the blocking axis A. The flow chambers 108 and 116 arranged toward the outside are delimited by the corresponding partition wall 110, 114 and by an outer wall 128, 130. The centrally arranged flow chamber 112 is delimited by the partition walls 110 and 114.

An outer contour 132 of the blocking portion 122 follows an ellipse in the section shown, wherein a main axis of the ellipse runs perpendicular to the blocking axis A.

FIG. 4 shows the valve body 100 in a longitudinal section along the central longitudinal axis M and along the blocking axis A. The at least one partition wall 110, 114 tapers, at least in some parts, in a longitudinal section in which the blocking axis A lies starting from the blocking portion 122. The flow chamber 108, 112, 116 increases in size along or parallel to the central longitudinal axis M starting from the blocking portion 122. The flow chamber 108, 112, 116 tapers outward in a cross section along or parallel to the blocking axis A.

FIG. 5 shows the valve body 100 in a longitudinal section perpendicular to the blocking axis A. The particular flow chamber 108, 112, 116 widens, in particular in a longitudinal section that is perpendicular to the blocking axis A, toward the blocking portion 122, at least in some parts, in particular continuously.

A course of a particular distal edge 134, 136 of the partition wall 110, 114 follows a convex curvature oriented toward the blocking portion 122 in each case.

FIG. 6 shows the process valve 600 in a section. A receiving body 602 has an interior space which, at least in some parts, follows a substantially non-compressed outer contour of the valve body 100, wherein the valve body 100 is accommodated in the interior space of the receiving body 602. A first valve drive 604, which is pneumatic in this case, is rigidly connected to the receiving body 602. Of course, another drive principle, such as an electric or magnetic drive, can also be used. A compressor 610 driven by the valve drive 604 and movable along the blocking axis A presses on the blocking portion 122 of the valve body 100 and thereby closes the valve body 100. To open the valve body 100, the compressor 610 pulls on the valve body 100 toward the associated drive.

A further valve drive, shown in FIG. 9, is fixed rigidly to the receiving body 602 on the opposite side of the first drive 604. A compressor driven by the further valve drive and movable along the blocking axis A presses on the blocking portion 122 of the valve body 100 and together with the compressor 610 thereby closes the valve body 100. In order to close and open the blocking portion 122, the compressor 610 and the additional compressor are operated simultaneously.

Figure 7:
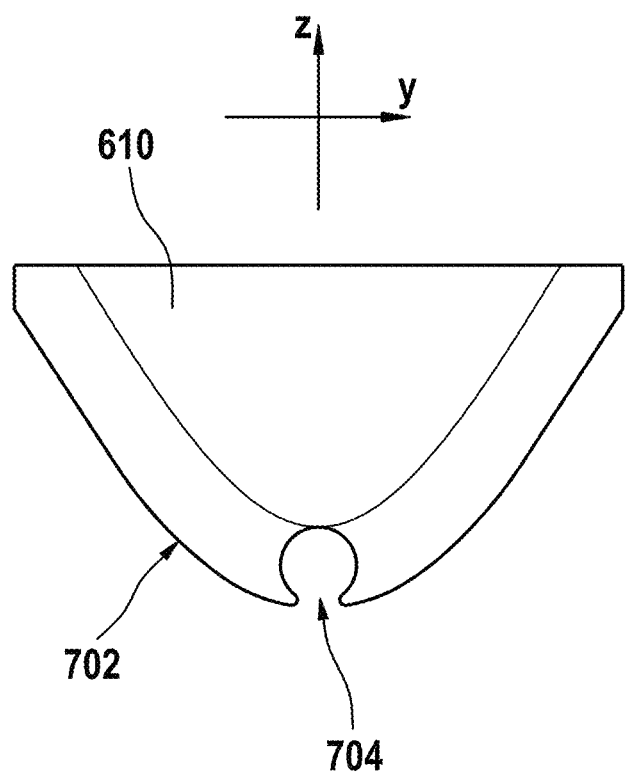
FIGS. 7 and 8 each show one compressor for the valve body.

FIG. 7 shows the compressor 610 from FIG. 6 in a plan view along or parallel to the central longitudinal axis of the valve body. A contact contour 702 for resting against a portion of the outer contour of the blocking portion of the valve body is convexly curved and suitable for operating the valve body by means of the drive from FIG. 6 arranged on one side. The contact contour 702 follows a parabola, for example. In the region of the blocking portion, the valve body has a port contour which is arranged in a recess 704 of the compressor 610. The port contour for a quick-change system, in deviation from the contour that is circular in cross section, can also have a bayonet closure portion, a thread, another positive locking contour, a button or a mushroom-shaped button top.

Figure 8:
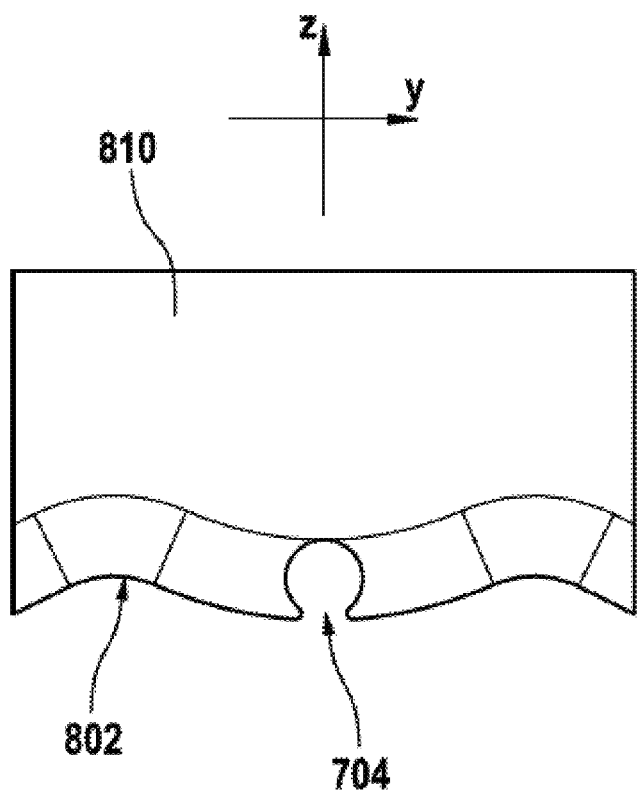

FIG. 8 shows, as an alternative to the compressor 610 from FIG. 6, a compressor 810 in a top view along or parallel to the central longitudinal axis of the valve body. A contact contour 802 follows a W-shape, wherein the contact contour 702 protrudes toward the valve body in the region of the recess 704. The compressor 810 is suitable for operating the valve body by means of two drives arranged opposite one another.

What is claimed is:

1. A valve body for a process valve, wherein an interior space of the valve body connects at least two ports to one another in a fluid-conducting manner, wherein at least one partition wall separates adjacent flow chambers of the interior space from one another, and wherein an outer shell and the at least one partition wall, at least in a blocking portion of the valve body extending essentially perpendicularly to a blocking axis, are made of a flexible material,
wherein the at least one partition wall follows a plane that is perpendicular to the blocking axis,
wherein a course of a distal edge of the at least one partition wall lies in the plane that is perpendicular to the blocking axis and follows a convex curvature oriented toward the blocking portion.

2. The valve body according to claim 1, wherein the valve body is made of the flexible material at least in a proximal region between the two ports.

3. The valve body according to claim 1, wherein an open cross section of the flow chambers are dimensioned larger perpendicular to the blocking axis than along the blocking axis.

4. The valve body according to claim 1, wherein the flow chambers are delimited by two opposing convexly curved contact surfaces.

5. The valve body according to claim 1, wherein the at least one partition wall follows a plane perpendicular to the blocking axis.

6. The valve body according to claim 1, wherein the valve body comprises an odd number of flow chambers.

7. The valve body according to claim 1, wherein the at least one partition wall tapers, at least in some parts, in a longitudinal section in which the blocking axis lies, starting from the blocking portion.

8. The valve body according to claim 1, wherein the flow chambers widen at least in some parts.

9. The valve body according to claim 1, wherein the distal edge is positioned transversely to the longitudinal axis or the flow axis.

10. A process valve comprising a valve body wherein an interior space of the valve body connects at least two ports to one another in a fluid-conducting manner, wherein at least one partition wall separates adjacent flow chambers of the interior space from one another, and wherein an outer shell and the at least one partition wall, at least in a blocking portion of the valve body extending essentially perpendicularly to a blocking axis, are made of a flexible material, wherein the at least one partition wall follows a plane that is perpendicular to the blocking axis, wherein a course of a distal edge of the at least one partition wall lies in the plane that is perpendicular to the blocking axis and follows a convex curvature oriented toward the blocking portion.

11. The process valve according to claim 10 comprising:
a receiving body, which has an interior space that at least partially follows a substantially non-compressed outer contour of the valve body, wherein the valve body is accommodated in the interior space of the receiving body; and
a valve drive which is arranged rigidly with respect to the receiving body, wherein a compressor driven by the valve drive and movable along the blocking axis presses on the blocking portion of the valve body.

12. The process valve according to claim 11 comprising:
a further valve drive which is arranged rigidly with respect to the receiving body on the opposite side of the first drive, wherein a further compressor which is driven by the further valve drive and movable along the blocking axis presses on the blocking portion of the valve body.

13. The process valve according to claim 10, wherein the distal edge is positioned transversely to the longitudinal axis or the flow axis.

* * * * *